United States Patent [19]
Smith et al.

[11] 3,836,867
[45] Sept. 17, 1974

[54] GAS BREAKDOWN LASER PULSE SELECTOR

[75] Inventors: David C. Smith, Glatonbury; Peter R. Solomon, Bloomfield, both of Conn.

[73] Assignee: United Aircraft Corporation, E. Hartford, Conn.

[22] Filed: Mar. 27, 1973

[21] Appl. No.: 345,406

[52] U.S. Cl. ... 331/94.5 Z, 331/94.5 A, 331/94.5 C, 307/88.3
[51] Int. Cl. ............................................. H01s 3/00
[58] Field of Search ........... 331/94.5; 307/88.3, 312

[56] References Cited
UNITED STATES PATENTS
3,433,555   3/1969   Linson ............................ 331/94.5

Primary Examiner—John K. Corbin
Assistant Examiner—R. J. Webster
Attorney, Agent, or Firm—Donald F. Bradley

[57] ABSTRACT

A single pulse or a selected number of pulses from a mode-locked laser may be isolated from the laser pulse train. A gas breakdown cell is positioned in the path of the laser pulse train and the laser pulses are focused within the cell. When the intensity of the pulses exceeds the gas breakdown threshold, a plasma is generated which acts as a highly reflecting mirror. In the preferred embodiment using a ring cavity geometry, the laser pulse train travels through the cell in one direction and the gas pressure in the cell is adjusted so that breakdown of the gas occurs near the peak intensity of the traveling pulse. The breakdown plasma reflects a portion of the breakdown pulse which propagates in the opposite direction from the original pulse train. A single nonmode-locked laser pulse may be shaped by using the reflection capabilities of the breakdown plasma formed in a gas cell.

6 Claims, 3 Drawing Figures

GAS BREAKDOWN LASER PULSE SELECTOR

The invention herein described was made in the course of or under a contract or subcontract thereunder with the Department of the Navy.

BACKGROUND OF THE INVENTION

1. Field of the Invention

This invention relates to lasers, and in particular to an apparatus for extracting a single pulse from a mode-locked laser pulse train. This invention also relates to the shaping and shortening of a single nonmode-locked laser pulse. The selected pulse will have a very short time duration, such pulses being quite useful in applications such as guidance, radar and photography.

The basis of the invention is the production of a plasma in a gas cell by causing the gas to break down in response to the laser pulse intensity. A portion of the pulse which ultimately causes the gas breakdown will be reflected from the plasma and will propagate in an opposite directon from the original mode-locked pulse train.

2. Description of the Prior Art

The generation of single, ultrashort laser pulses is quite useful in both commercial and military applications. For example, generation of an optical pulse of $10^{-10}$ seconds time duration would enable the measurement of a distance of several miles to an accuracy of a few centimeters.

Prior art techniques for generating a single, high power laser pulse have involved electrooptic devices acting as fast shutters, requiring expensive equipment and very accurate electronic timing. For example, in U.S. Pat. No. 3,521,069 there is disclosed the use of an optical shutter, preferably a Kerr or Pockels cell, which is positioned in the path of a mode-locked laser pulse train. A detector is also positioned to respond to the laser pulses. When the amplitude of the laser pulses achieves a predetermined magnitude, the cell is actuated for a time sufficient to pass or reflect one of the laser pulses.

The present invention is an improvement over the prior art devices and enables the isolation or generation of a single, high power, short duration laser pulse without the expense and the synchronization problems encountered with the prior art electrooptic devices. The apparatus is not only simple and inexpensive, but also offers an improvement in the coupling coefficient and in the isolation of the selected pulse from background radiation as compared to the prior art devices.

SUMMARY OF THE INVENTION

To accomplish the isolation of a single mode-locked laser pulse from a pulse train, a gas cell containing a gas such as argon at a predetermined pressure is placed in the path of a train of mode-locked laser pulses. A pair of lenses are positioned to form opposite walls of the gas cell. The energy from the laser pulse train is focused by one of the lenses within the gas cell. When the intensity of the pulses exceeds the gas breakdown threshold of the gas, a dense plasma is generated at the focus which acts as a highly reflecting mirror. The latter portions of the laser pulse which initiated the breakdown will be reflected from the plasma and transmitted in the opposite direction from the original pulse train. The plasma also acts as an absorber for laser radiation after breakdown.

In one embodiment of the invention, the laser is positioned in a ring cavity geometry, and the laser is forced to operate as a traveling wave laser in one direction. When breakdown of the gas occurs, the isolated pulse will travel in the opposite direction and will be coupled from the cavity.

In a second embodiment of the present invention, the pulses from the laser pulse train which pass through the original gas cell breakdown plasma are focused within a second gas cell containing a single lens. When gas breakdown occurs in the second gas cell, a portion of the pulse initiating the breakdown will be reflected from the plasma as in the previous embodiment.

In a third embodiment of the present invention, the laser pulse train is focused twice at the same point in a gas during two orthogonal passes through the gas cell, the gas cell parameters and the focus being adjusted so that the second pass will cause gas breakdown.

DESCRIPTION OF THE PREFERRED EMBODIMENT

Figure 1:
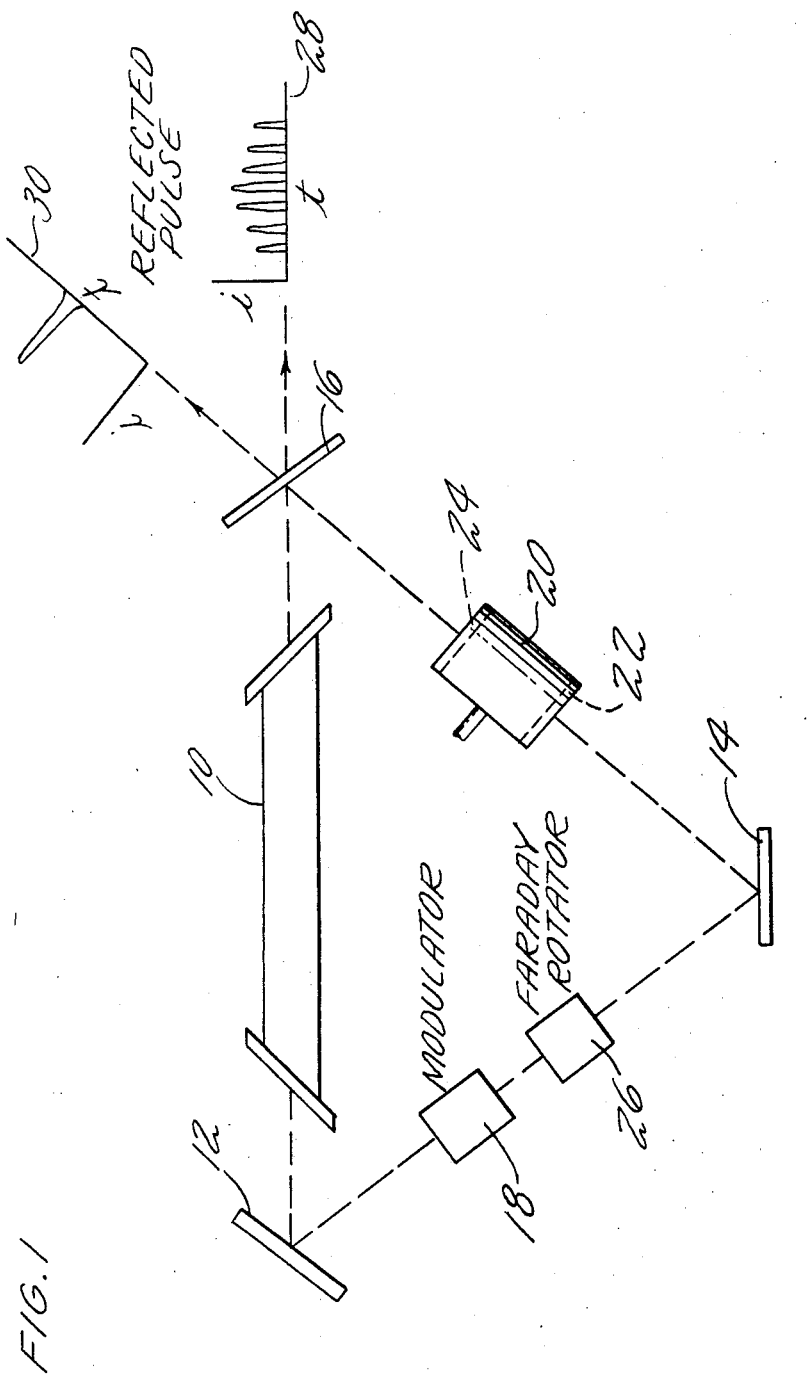
FIG. 1 is a schematic diagram of a laser pulse selection apparatus utilizing a ring cavity geometry.

Referring specifically to FIG. 1, there is shown a typical laser in a ring cavity geometry. The laser 10, which may be, for example, an electrically pulsed $CO_2$ laser, is positioned in a cavity comprising mirrors 12, 14 and 16. Mirrors 12 and 14 are preferably 100 percent reflecting, whereas mirror 16 is partially transmitting. The output from the laser is mode locked by any known technique, such as germanium acousto-optic modulator positioned in the laser cavity. Also positioned in the path of the laser pulse train is a variable pressure gas breakdown cell 20 having germanium lenses 22 and 24 at opposite walls thereof. The structure and operation of a gas filled breakdown cell is described in detail in U.S. Pat. No. 3,433,555. Briefly, breakdown of the gas within the cell, typically argon, is accomplished by focusing the laser pulses at a point within the gas cell through one of the lenses. A high power density is created at the focal region. For each particular case of gas composition and pressure there exists a breakdown threshold intensity. If the maximum power density at the focal region is below the threshold value, the laser pulse passes through the cell with negligible attenuation or degradation of its spatial coherence. When the power density exceeds this threshold value, the gas at the focal region breaks down and a dense plasma and shock wave are generated which severely attenuate any further laser energy entering the system until recombination and diffusion have dissipated the plasma. The other lens in the cell recollimates the focused laser beam and allows it to pass unaffected when no breakdown occurs.

In the embodiment of FIG. 1, the laser is forced to operate as a traveling wave laser in a specified direction, clockwise, for example, by a unidirectional pulse selector which can consist of a Faraday rotator and a half wave plate. The unidirectional selector 26 creates a greater loss for the counterclockwise traveling wave than for the clockwise traveling wave. Under specified conditions the ring laser may be made to run in only one direction without the use of a unidirectional pulse selector because of radiation scattering or inhomogeneity of the laser causing a preference for one direction. If a unidirectional pulse selector is required, the Faraday rotator can be made from $n$-type InSb or CdS half wave plates for the 10.6 micron wavelength of the $CO_2$ laser radiation.

If a polarizer is required to select the direction of oscillation, Brewster angled salt flats may be used.

In ordinary operation, a train of mode-locked pulses such as is shown by the output pulse train 28 is emitted from the partially transmitting mirror 16. With a variable pressure breakdown cell 20 positioned in the ring cavity, the intensity of the circulating mode-locked pulses builds up to a maximum value at the focal point within the cell. When the intensity of the pulse exceeds the gas breakdown threshold, a dense plasma is generated at the focus within the cell. For example, the first three pulses from the pulse train shown at 28 may pass through the cell unattenuated, but at the same time the intensity within the cell 20 is increasing. When the fourth pulse from the pulse train is focused within the cell by the lens 24, a plasma is generated which acts as a highly reflecting mirror. If the pressure within the gas cell 20 is adjusted so that breakdown occurs at the peak of the fourth pulse, the latter portion of the pulse will be reflected from the plasma and be transmitted through the partially transmitting mirror 16 in a direction different from the normal output pulses 28 and as shown at 30.

Measurements have shown that breakdown plasmas can reflect as high as 20 percent of the incident laser light. Typically the breakdown threshold for atmospheric argon is about $10^9$ watts/cm$^2$, a value which is easily achieved with megawatt peak powers generated in a typical high pressure laser. Furthermore, the breakdown threshold varies inversely with gas pressure, and the pressure can easily be adjusted so that the gas breakdown will occur when a mode-locked pulse reaches its peak amplitude. By adjusting the cell pressure, it is therefore possible to select which of the pulses will be reflected.

Because of the relatively high reflectivity obtained from the gas breakdown plasma in cell 20, a relatively high coupling coefficient will be achieved from the apparatus of FIG. 1. Further, the breakdown plasma in cell 20 expands rapidly and its density is reduced significantly in a short time. In a typical cavity, the portion of the laser pulse which initiates breakdown and which is not reflected from the plasma will pass through the cell and make a complete transit of the cavity, again passing through the gas cell 20. A typical cavity transit time would be 50 nanoseconds. The plasma formed in the gas cell 20 will be reduced by this time so that very little of the recirculated pulse is reflected. Consequently, the ratio of the ejected pulse intensity to background intensity is very large.

Figure 2:
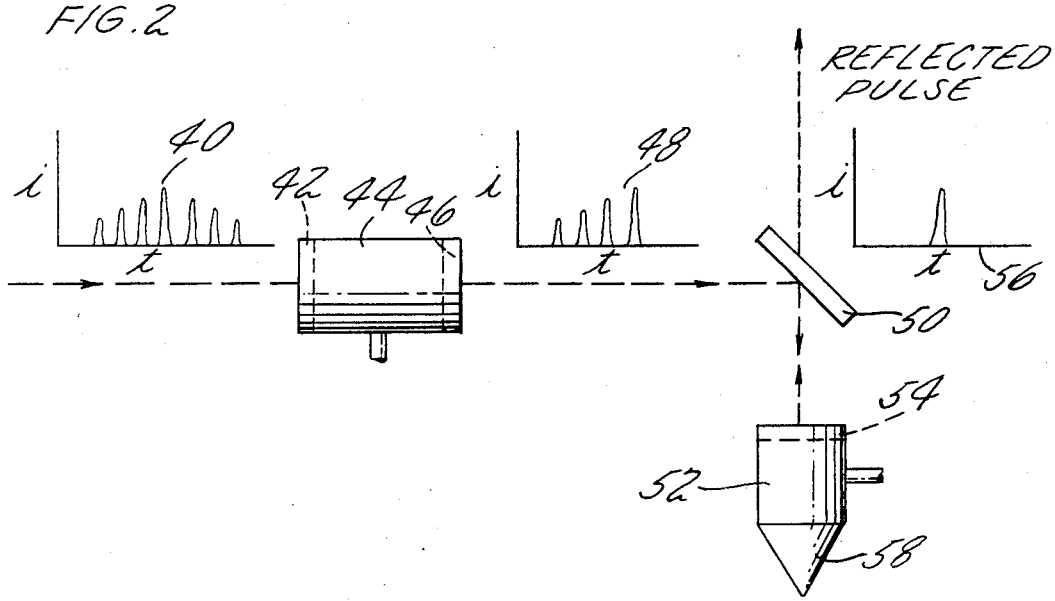
FIG. 2 is a schematic diagram of a laser pulse selection apparatus in which two gas cells are utilized.

In FIG. 2 there is shown a modified apparatus for isolating a single laser pulse which does not require a ring cavity geometry. A train of pulses from a mode-locked laser such as shown at 40 is incident on the focusing lens 42 of a gas cell 44, the gas cell being similar to that shown at 20 of FIG. 1. The gas pressure in the cell is adjusted until there is sufficient energy or integrated intensity in the first few pulses to develop breakdown. Before breakdown occurs, the laser pulse train passes through the cell 44 and through the recollimating lens 46. When breakdown occurs in the gas, the remaining pulses in the pulse train will be attenuated, the ratio of the peak intensity to transmit intensity through the breakdown plasma being as high as 100. If breakdown occurs, for example, with the fourth pulse of the pulse train, only the first four pulses shown at 48 will have passed through the gas cell 44.

The pulses which have passed through the gas cell are reflected from a beam splitter mirror 50 into a second gas cell 52 through a focusing lens 54. Cell 52 is also filled with a pressurized gas whose pressure is adjusted such that breakdown will occur, for example, on the fourth pulse in the train. When breakdown occurs in cell 52, a large fraction of the peak pulse will be reflected and pass through beam splitter 50 in the opposite direction. The reflected pulse is shown at 56. The bottom portion 58 of the cell 52 acts as a light dump, and may be coated or otherwise geometrically configured so that the pulses which pass through lens 54 and into cell 52 prior to gas breakdown within the cell will not be reflected from the cell.

The embodiment of FIG. 2 is not limited to the selection of a single pulse. If gas cell 52 is pressurized such that breakdown occurs on the third pulse, both the third and fourth pulses will be reflected from the plasma generated at breakdown. The only criterion is that the pulses that are eliminated by the action of cell 52 have sufficient energy to generate gas breakdown.

Figure 3:
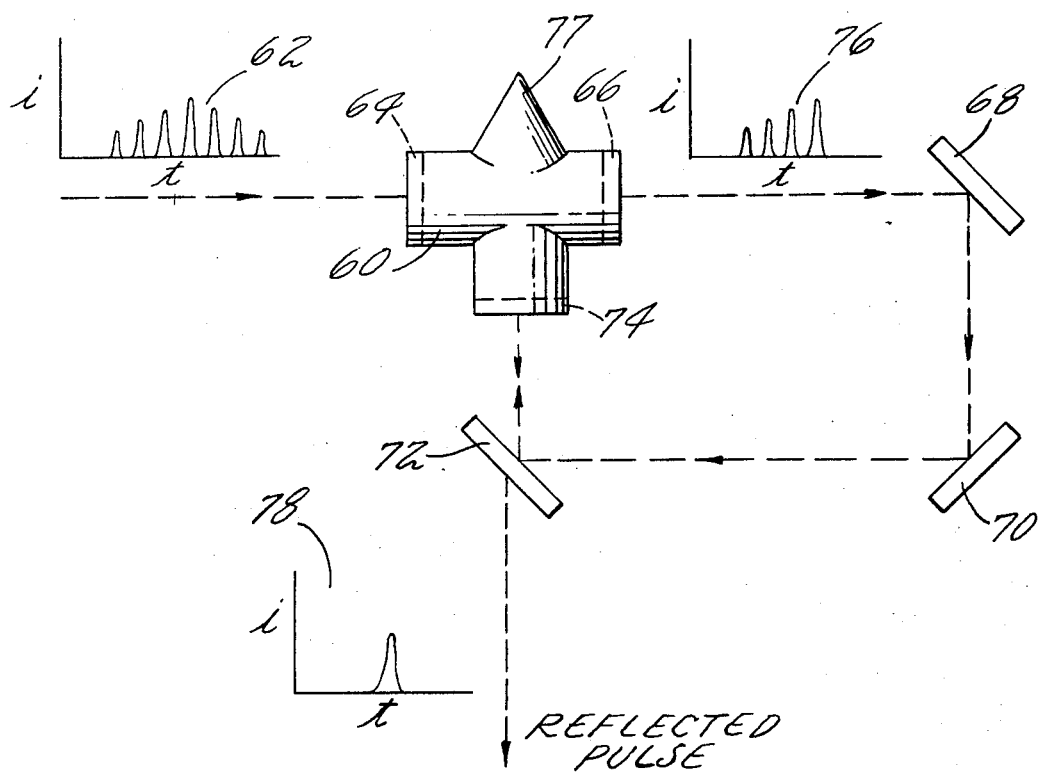
FIG. 3 is a schematic diagram of a laser pulse selection apparatus in which a single gas cell having three lenses is utilized.

An alternative technique using gas breakdown for single pulse selection is shown in FIG. 3. In this embodiment, a single gas breakdown cell 60 is used for both absorption and reflection. A laser pulse train shown at 62 is focused by lens 64 into the gas cell 60. Prior to breakdown, the pulses pass through the gas cell and exit through recollimating lens 66, and are then reflected by mirrors 68 and 70 and beam splitter 72 to pass into gas cell 60 through a second focusing lens 74. Assuming that the first three pulses of pulse train 62 pass through the cell 60 and that breakdown occurs with the fourth pulse of the train, the first three pulses are delayed with respect to the fourth pulse, the delay time being equal to the time it takes a pulse to traverse the distance from the cell to the lens 74. If lenses 64 and 74 are focused at the same point within the gas cell 60, when breakdown occurs and a plasma is formed, the remaining pulses in pulse train 62 will be attenuated by the plasma, thereby preventing their passage through the cell 60. The pulses which have already passed through the cell 60, shown at 76, will be attenuated within the cell 60 by light dump 77 prior to gas breakdown, and reflected from the plasma within the cell after breakdown occurs.

If the gas pressure is adjusted so that the last pulse in the train 76 will cause breakdown and the time required to propagate from 66 to 74 is less than the pulse spacing, only a single pulse will be reflected from the plasma and will pass back through lens 74 and beam splitter 72 as shown at 78. However, as in the FIG. 2 embodiment, more than one pulse may be reflected from the breakdown plasma. The apparatus of FIG. 3 eliminates the requirement of two gas breakdowns and the timing problems associated with the embodiment of FIG. 2.

It is apparent that the pulse selection technique disclosed can also be employed to shape or shorten a single nonmode-locked laser pulse. For example, using the lens system of FIG. 2, the pulse envelope of a nonmode-locked pulse would have the same characteristic shape as that shown at 40. When breakdown occurs in cell 52, a portion of the pulse will be reflected giving a pulse similar to that shown at 56. In this case the rise time of the pulse reflected from cell 52 will be determined by the buildup time of the reflecting breakdown plasma in cell 52. The fall time of the reflected pulse is determined by the buildup of the absorbtivity of the breakdown plasma in cell 44.

It is also apparent that in the case of a mode-locked pulse train the pulse selection technique could lead to a shortening of the selected pulse.

While the invention has been disclosed with respect to its preferred embodiment, it is apparent that changes may be made to the construction and operation of the invention without departing from its scope as hereinafter claimed.

We claim:

1. A laser pulse selector comprising
   means for generating a train of mode-locked laser pulses,
   means for propagating said pulse train in a preselected direction,
   a variable pressure gas breakdown cell having a first lens forming a wall thereof and filled with a pressurized gas forming a plasma when said gas is energized to a specified power density,
   a partially transmitting mirror positioned in the path of said pulse train for reflecting said pulse train therefrom in a direction to intersect said first lens,
   means including said first lens for focusing said laser pulse train at a point within said gas cell and producing a power density sufficiently high to form a gas plasma therein,
   means including said plasma for reflecting from said gas cell the portion of the laser pulse train incident thereon during the existence of said plasma and propagating said reflected laser pulses along a path opposite the path of said incident pulse train toward said partially transmitting mirror,
   and means including said partially transmitting mirror for passing therethrough at least a portion of said reflected laser pulses.

2. A laser pulse selector as in claim 1 in which said means for generating a train of mode-locked laser pulses includes a laser gain medium inserted along the optical path in one leg of a ring resonator, said resonator also including said partially transmitting mirror,
   and said gas cell including a second lens positioned in the wall of said gas cell opposite said one lens, said gas cell being located in one leg of said ring resonator other than the leg containing said laser gain medium and in said resonator optical path and passing through said first and second lenses the portion of the laser pulse train incident thereon prior to the generation of said plasma within said gas cell.

3. A laser pulse selector as in claim 2 in which said means for causing said laser pulse train to propagate within said ring resonator in a preselected direction is an acousto-optic modulator positioned in a leg of said resonator and in the optical path thereof.

4. A laser pulse selector as in claim 1 in which said gas cell includes second and third lenses forming opposite walls thereof and said one lens forming a wall of said cell at right angles to said second and third lenses, said propagating means directing said laser pulse train through said second and third lenses toward said partially transmitting mirror, and means including said second lens for focusing said laser pulses at said point within said gas cell.

5. A laser pulse selector as in claim 1 and including a second gas cell having second and third lenses positioned in the path of said laser pulse train and passing therethrough toward said partially reflecting mirror the initial portion of said laser pulse train prior to breakdown of a gas in said second cell and attenuation of the remainder of said pulse train.

6. A laser pulse selector comprising
   a ring resonator including a plurality of mirrors, at least, one of said mirrors being partially transmitting,
   a laser gain medium positioned in one leg of said resonator,
   means for generating a train of mode-locked laser pulses,
   means for propagating said pulse train about said resonator in a selected direction,
   a gas cell having first and second lenses forming opposite walls thereof positioned in the optical path within another leg of said resonator, said gas cell containing a pressurized gas,
   means including said first lens for focusing said laser pulse train within said gas cell to cause breakdown of said gas and formation of a plasma,
   means including said plasma for reflecting from said gas cell in a direction opposite said selected direction the portion of the laser pulse train incident thereon during the existence of said plasma,
   and means including said partially transmitting mirror for passing said reflected laser pulses out of said resonator.

* * * * *